(12) United States Patent
Katz et al.

(10) Patent No.: US 8,496,286 B1
(45) Date of Patent: Jul. 30, 2013

(54) AERODYNAMIC SIDEWALL POST FOR A TRAILER

(75) Inventors: Ben Katz, Yardley, PA (US); George A. Schmidt, Langhorne, PA (US)

(73) Assignee: Strick Trailers, LLC, Fairless Hills, PA (US)

( * ) Notice: Subject to any disclaimer, the term of this patent is extended or adjusted under 35 U.S.C. 154(b) by 0 days.

(21) Appl. No.: 13/427,871

(22) Filed: Mar. 22, 2012

(51) Int. Cl.
*B62D 25/02* (2006.01)

(52) U.S. Cl.
USPC ..................... 296/186.1; 296/180.1

(58) Field of Classification Search
USPC ............... 296/186.1, 180.1, 180.2, 180.4
See application file for complete search history.

(56) References Cited

U.S. PATENT DOCUMENTS

| | | | | |
|---|---|---|---|---|
| 5,286,079 A | * | 2/1994 | Zubko et al. | 296/186.1 |
| 5,584,252 A | * | 12/1996 | Smith et al. | 105/409 |
| 5,997,076 A | * | 12/1999 | Ehrlich | 296/186.1 |
| 7,588,286 B2 | * | 9/2009 | Lewallen et al. | 296/186.1 |
| 7,621,589 B1 | * | 11/2009 | Gerome | 296/186.1 |
| 7,798,753 B2 | * | 9/2010 | Yurgevich | 410/115 |
| 7,926,866 B2 | * | 4/2011 | Schmidt et al. | 296/181.1 |
| 8,016,152 B2 | * | 9/2011 | Roush et al. | 220/652 |
| 8,033,594 B2 | * | 10/2011 | Nusbaum | 296/180.4 |
| 2004/0239147 A1 | * | 12/2004 | Fenton et al. | 296/186.1 |
| 2009/0295189 A1 | | 12/2009 | Distel et al. | |
| 2011/0181072 A1 | | 7/2011 | Kempster | |
| 2011/0272963 A1 | | 11/2011 | Henderon et al. | |

\* cited by examiner

*Primary Examiner* — Joseph Pape
(74) *Attorney, Agent, or Firm* — Keith Swedo

(57) ABSTRACT

A sidewall construction arrangement for a trailer includes a plurality of upstanding sidewall panels. Each of a plurality of vertically oriented posts is disposed between and engages a respective substantially coplanar pair of the panels. Each post has an exterior surface that is entirely continuous in a vertical cross-sectional view throughout a portion of the post that extends beyond the panels in a lateral direction.

18 Claims, 6 Drawing Sheets

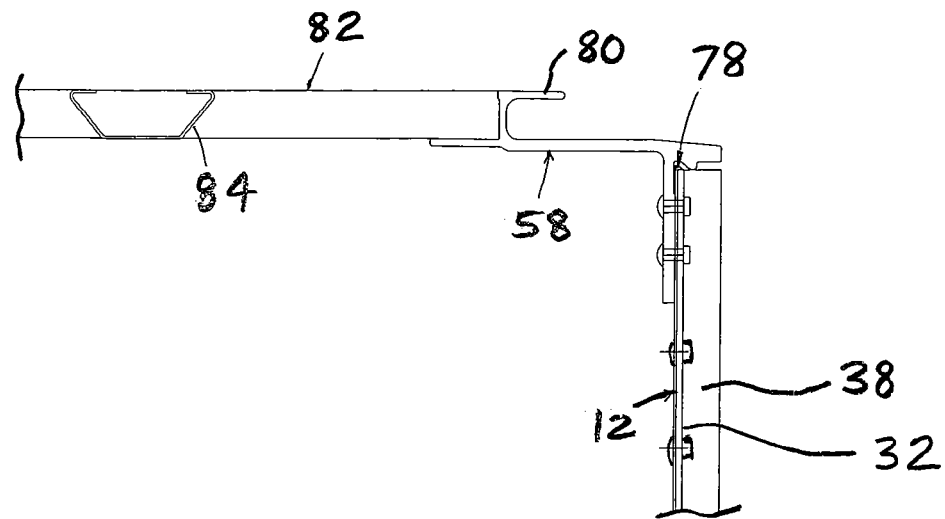
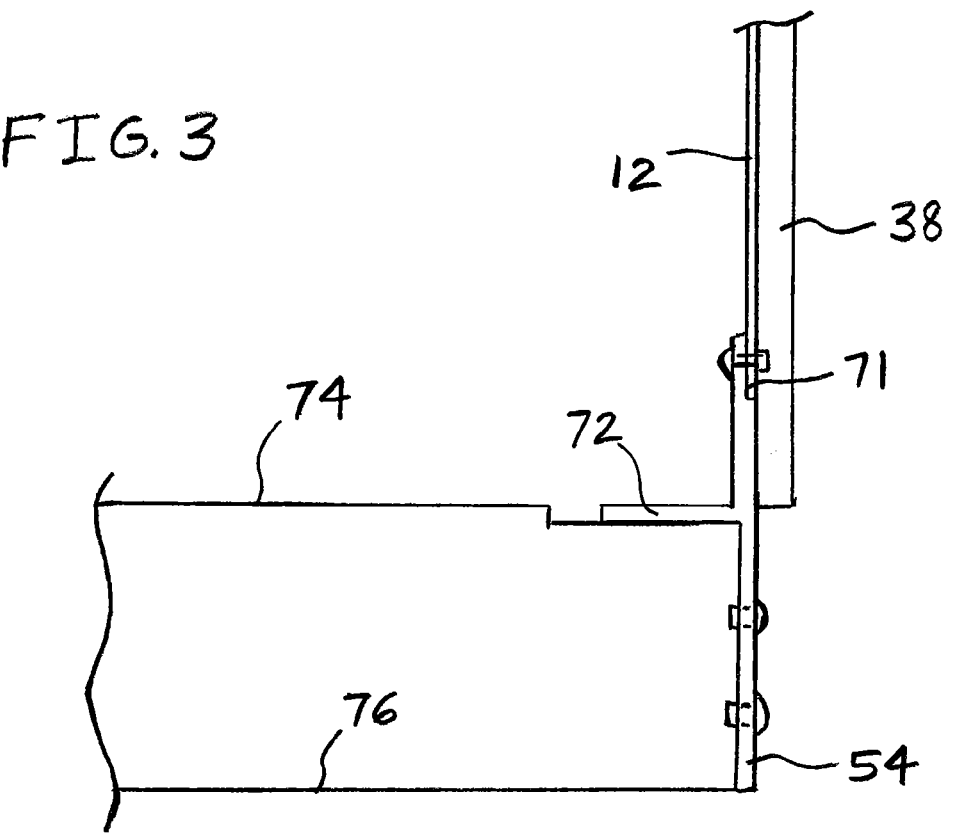
FIG. 3

AERODYNAMIC SIDEWALL POST FOR A TRAILER

BACKGROUND

The present invention relates to trailers and transport vehicles and, more particularly, to the sidewall structure of such trailers or transport vehicles.

Transport vehicles, such as trailers, typically include a cargo space enclosed by a plurality of walls and a roof. Objects needing transport from one place to another are loaded into the cargo space and are protected from rain, snow, ice, dirt, road debris and other elements during transport by the roof and walls of the trailer.

The sidewalls and front panel of the trailer commonly include a plurality of aluminum sheets or plates (in thickness greater than 1/16 inch), steel sheets, fiberglass reinforced plywood or other composite material (generally made of metal facings laminated onto plastic or other material) cut and formed into sheets or panels which are attached to each other in series at their opposite side edges. The sidewalls may include vertical supports ("posts" or "logistics posts") as well as the sheets or panels to provide for strength, stiffness or cargo restraints. The trailer also generally includes at least one door allowing access to the cargo space, and often this door is on the rear wall of the trailer. In addition to the walls, the trailer includes a roof and floor arrangement which may rely on the structural integrity of the sidewalls.

Mounting points may be provided along the interior of the cargo container for cargo restraint systems and other purposes. Such mounting points may be obtained by incorporating specific cutouts or apertures into the inside surfaces of the trailer. These apertures can be incorporated into the vertically-oriented logistics posts which are often inserted into the joining means between adjacent panels.

The vertically-oriented logistics posts may be exposed on the outer surface of the trailer, in-between the panels. Because the posts may include some sort of lateral recesses to receive and retain the adjacent sheets or panels, the posts commonly extend outwardly from the trailer in a horizontal direction. Because the posts extend laterally to some degree beyond the side sheets or side panels, the posts add to the drag or wind resistance of the trailer as it travels along the highway, particularly at high speed. Such drag or wind resistance decreases the gasoline mileage of the truck that pulls the trailer.

What is neither disclosed nor suggested by the prior art is a trailer with side posts that do not substantially add to the wind resistance of the trailer.

SUMMARY

The present invention provides a trailer including aerodynamic side posts that provide the trailer with reduced wind resistance. The side posts have a portion that extends laterally beyond the side panels. An exterior surface of the laterally-extending portion is continuous when viewed in a vertical cross-sectional direction. In a particular embodiment, the exterior surface of the laterally-extending portion may be convexly curved and/or in the shape of a streamlined half-body.

The invention comprises, in one form thereof, a sidewall construction arrangement for a trailer including a plurality of upstanding sidewall panels. Each of a plurality of vertically oriented posts is disposed between and engages a respective substantially coplanar pair of the panels. Each post has an exterior surface that is entirely continuous in a vertical cross-sectional view throughout a portion of the post that extends beyond the panels in a lateral direction.

The invention comprises, in another form thereof, a sidewall construction arrangement for a trailer including a plurality of upstanding sidewall panels. Each of a plurality of vertically oriented posts is disposed between a respective substantially coplanar pair of the panels. Each post has an exterior surface that is entirely convexly curved with respect to a vertical cross-sectional view throughout an entire portion of the post that extends beyond the panels in a lateral direction.

The invention comprises, in yet another form thereof, a sidewall construction arrangement for a trailer including a plurality of upstanding sidewall panels. Each of a plurality of vertically oriented posts is disposed between a respective substantially coplanar pair of the panels. Each post has an exterior surface that is entirely convexly curved throughout an entire portion of the post that extends beyond the panels in a lateral direction. The portion of the post that extends beyond the panels in a lateral direction has a leading edge and a trailing edge. The portion has a maximum width relative to the lateral direction. The maximum width is closer to the leading edge than to the trailing edge.

An advantage of the present invention is that the aerodynamic side panels provide the trailer with decreased wind resistance, and thus better gas mileage.

Another advantage of the present invention is that the convex curvature of the logistics posts provides the post with greater structural integrity, and resistance to being bent about a horizontal axis that is parallel to the side panels

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 3 is a fragmentary cross-sectional view of the sidewall of the trailer taken along line 3-3 of FIG. 1;

Figure 1:
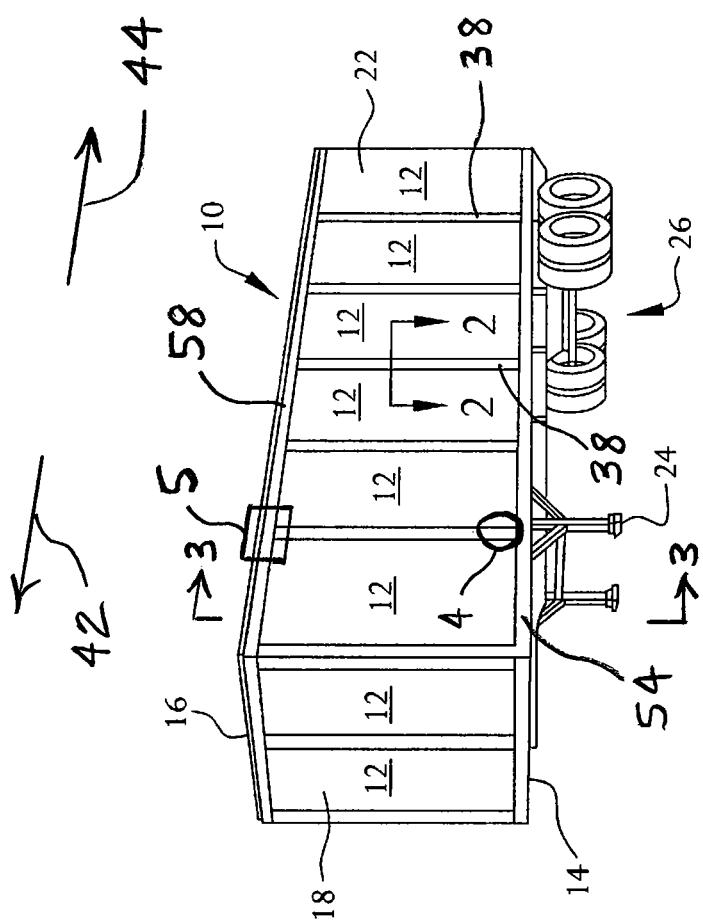
FIG. 1 is a perspective view generally showing a trailer, which is one type of cargo container that may incorporate the features of the present invention.

Corresponding reference characters indicate corresponding parts throughout the several views. Although the drawings represent embodiments of the present invention, the drawings are not necessarily to scale and certain features may be exaggerated in order to better illustrate and explain the present invention. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

Referring to the drawings, wherein like numerals indicate like elements, FIG. 1 shows a perspective view of a trailer 10. The present invention is not restricted to a trailer, but more broadly relates to the construction of cargo containers and transport vehicles, including trailer bodies adapted to be hauled by tractor units (not shown). The terms "trailer", "container", "cargo container" and "transport vehicle" are used interchangeably herein and each such term is meant to designate a partially-closed or closed, hollow structure for carrying cargo. The trailer 10 includes a roof 16, a floor 14, a front wall 18, a pair of opposing sidewalls 22, and a rear cargo door (not shown). The trailer 10, as illustrated in FIG. 1, may include provisions at the base thereof for a running gear 26 and a landing gear 24 in which case the trailer support assembly or running gear 26 is positioned adjacent to or near the rear end of the trailer and the landing gear 24 is positioned forward of the running gear 26 and is used to support the trailer when a tractor is not attached. Between the landing gear 24 and the running gear 26 the floor may be supported by a frame or may simply rely on the strength of the sidewall.

The trailer sidewall 22 includes a plurality of vertical upstanding panels 12. Front wall 18 may also include a plurality of vertical upstanding panels 12 (e.g., two panels 12 are shown in the embodiment of FIG. 1) which may or may not be sized similarly to panels 12 on sidewall 22. Each panel 12 may have a predetermined length, height, width and thickness; however, any or all of these parameters may or may not vary from panel to panel. Panels 12 that are on a same sidewall 22 may be parallel to each other and/or coplanar. Panels 12 on opposite sidewalls 22 may be parallel to each other.

Figure 2A:
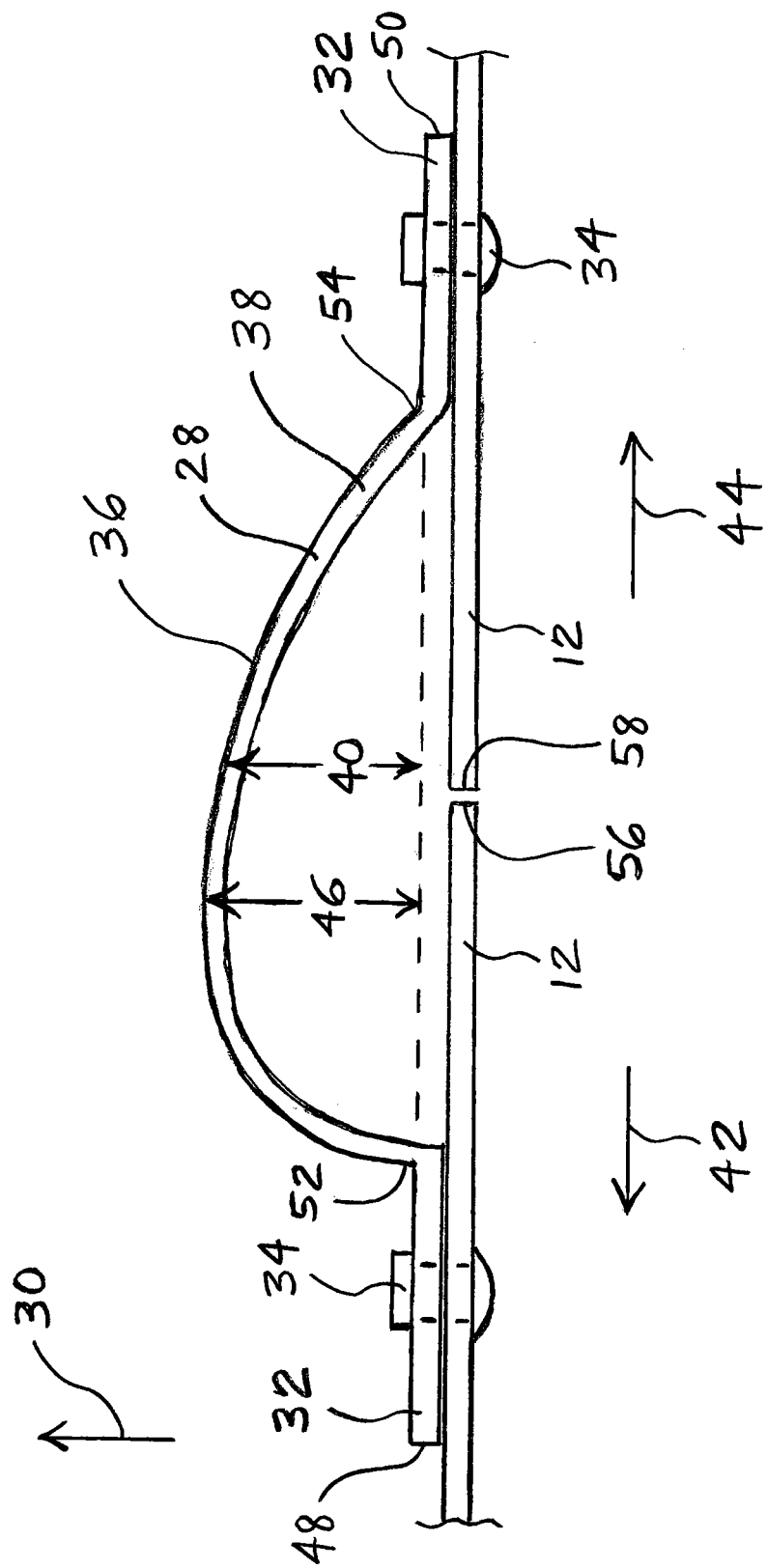
FIG. 2a is a cross-sectional view of one embodiment of an arrangement of the invention along line 2-2 of FIG. 1.
Figure 2B:
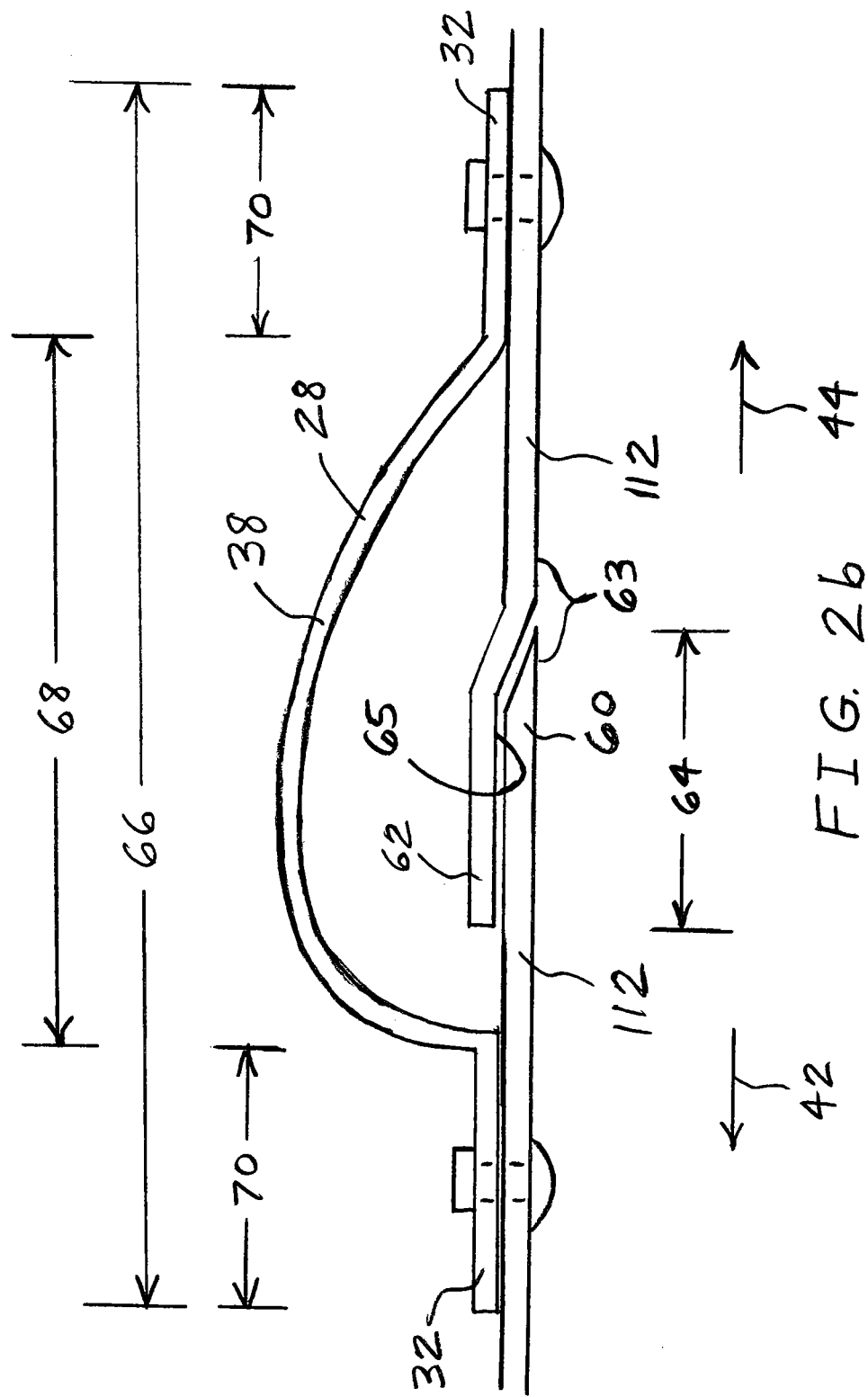
FIG. 2b is a cross-sectional view of another embodiment of an arrangement of the invention along line 2-2 of FIG. 1.

Between each pair of adjacent panels on a sidewall 22 is an upstanding inventive logistics post 38. Posts 38 may be formed of steel or other metal material in order to provide structural strength to sidewall 22. FIG. 2a illustrates one embodiment of post 38 in a vertical cross-sectional view along lines 2-2. Post 38 may have this same streamlined half-body profile shape throughout its length between top rail 58 and bottom rail 54. However, it is to be understood that bottom rail 54 is omitted from FIG. 2a and the other embodiment of FIG. 2b for clarity of illustration. Post 38 has a laterally extending portion 28 that extends away from panels 12 in a lateral direction 30 and two planar portions or flanges 32 that engage, physically contact and/or are attached to panels 12, such as by rivets 34 or other fasteners. The position and countersinking of each rivet and the use of rivets is shown for convenience but other fastening methods and arrangements are possible to attach panels 12 to posts 38. Lateral direction 30 may be perpendicular to an imaginary plane defined by the coplanar pair of panels 12 that engage post 38.

An exterior surface 36 of laterally extending portion 28 may be entirely continuous in the vertical cross-sectional view of FIG. 2a substantially throughout the portion 28 of the post that extends away from panels 12 in lateral direction 30. In the particular embodiment of FIG. 2a, laterally extending portion 28 is entirely arcuate and, more specifically, entirely convex in the vertical cross-sectional view of FIG. 2a substantially throughout the portion 28 of the post that extends away from panels 12 in lateral direction 30. As shown in FIG. 2a, laterally extending portion 28 may have a hemi-teardrop shape. That is, laterally extending portion 28 may have the same shape as that of one-half of a teardrop.

The portion 28 of post 38 that extends away from panels 12 in lateral direction 30 has a width 40 in lateral direction 30 that varies along a forward direction 42 and/or a rearward direction 44. Post 38 may have a maximum width 46 at a point that is closer to a leading edge 48 of post 38 than to a trailing edge 50 of post 38. Further, maximum width 46 may be closer to a leading edge 52 of post portion 28 than to a trailing edge 54 of post portion 28. In one embodiment, maximum width 46 may be approximately between 0.7 inch and 0.9 inch.

A shape of exterior surface 36 of portion 28 may be defined by:

$$x = \cos t$$

$$y = \sin t \sin^m(t/2)$$

wherein x is an axis defined from leading edge 52 of the portion 28 of post 38 that extends from panels 12 in lateral direction 30 to a trailing edge 54 of the portion 28 of post 38 that extends from panels 12 in lateral direction 30, and y is an axis aligned with lateral direction 30. For example, if $t=0$, then $x=1$ and $y=0$, which may correspond to trailing edge 54 of portion 28. Also, if $t=\pi/2$, then $x=-1$ and $y=0$, which may correspond to leading edge 52 of portion 28. The exponential variable m in the equation may be some value greater than 7 in one embodiment.

During use, when trailer 10 is being pulled in forward direction 42, the shape of portion 28 provides a low coefficient of drag which may result in better fuel efficiency for the truck cab that is pulling trailer 10. For example, a post with an extending portion that is rectangular with squared off edges may have a drag coefficient of about 1.5. In contrast, the drag coefficient of post 38 with the aerodynamic shape may be about 0.09.

As shown in FIG. 2a, panels 12 may have squared off opposing edges 56, 58 that are closely adjacent or abut against each other with no overlap relative to lateral direction 30. In contrast, in the embodiment of FIG. 2b, opposing edges 60, 62 are configured to overlap each other such that the lengths of panels 112 along forward and rearward directions 42, 44 do not have to be manufactured with tolerances that are as tight. That is, a length 64 of the overlap may vary with the actual lengths of panels 112. However, as long as there is some non-zero overlap, the inner surface 63 of the sidewall may be substantially smooth. More particularly, leading edge 60 of panel 112 may include a pocket or offset 65 for receiving a trailing edge 62 of adjacent panel 112. The post 38 shown in FIG. 2a may be substantially identical to the post 38 shown in FIG. 2b.

A length 66 of post 38 may be approximately between four and six inches. A length 68 of curved portion 28 may be approximately between 2.5 and 3.0 inches. Flanges 32 may have lengths 70 approximately between 1.0 and 1.5 inch.

Figure 4:
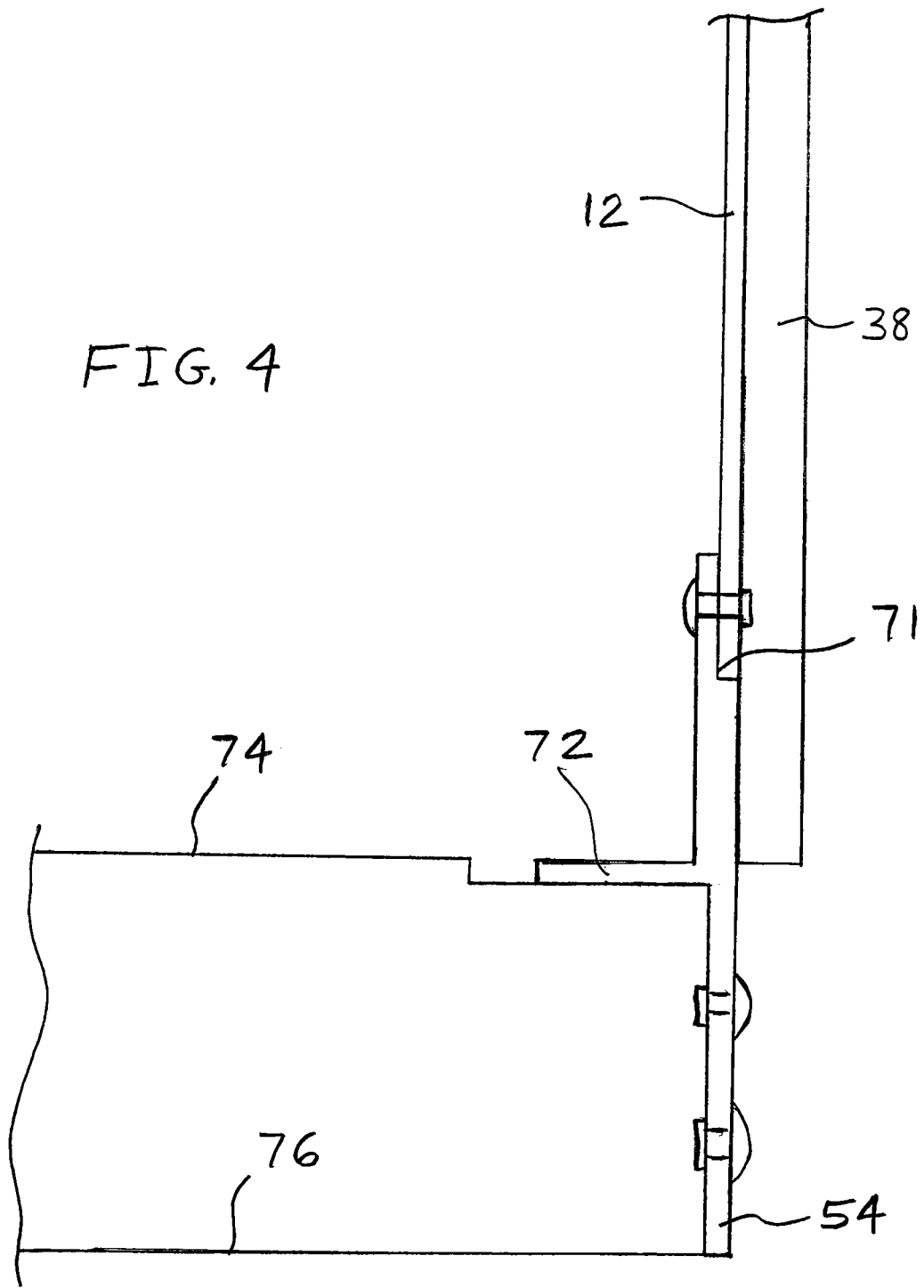
FIG. 4 is an enlarged view of the bottom portion of FIG. 3, corresponding to the encircled region 4 of FIG. 1.

FIG. 3 is a fragmentary cross-sectional view of sidewall 22 of trailer 10 taken along line 3-3 of FIG. 1. A top end of post 38 is attached to top rail 58, and a bottom end of post 38 is attached to bottom rail 54. More particularly, the bottom end of post 38 may be attached to bottom rail 54 via rivets or other fasteners. Panel 12 may be sandwiched between flange 32 of post 38 and bottom rail 54 at the location of the rivet. Bottom rail 54 may include a pocket or recess 71 which receives a bottom end of panel 12 such that panel 12 may rest upon bottom rail 54. Bottom rail 54 may include a horizontal leg 72 which engages and/or rests upon floor 74. A bottom end of bottom rail 54 may be attached to a cross member 76, such as by rivets or other fasteners. FIG. 4 is an enlarged view of the bottom portion of FIG. 3.

The side panel connection to the bottom rail may be protected by foam tape. Foam tape may be used in other joints as well. Although rivets may be used to attach panels 12 and posts 38 to bottom rail 54, and/or rivets may be used to attach panels 12 to bottom rail 54, it is also possible to use adhesive bonds, threaded fasteners (e.g., screws, bolts), seam welding, spot welding, nails or pins along the joints to attach panels 12 and/or posts 38 to bottom rail 54.

Figure 5:
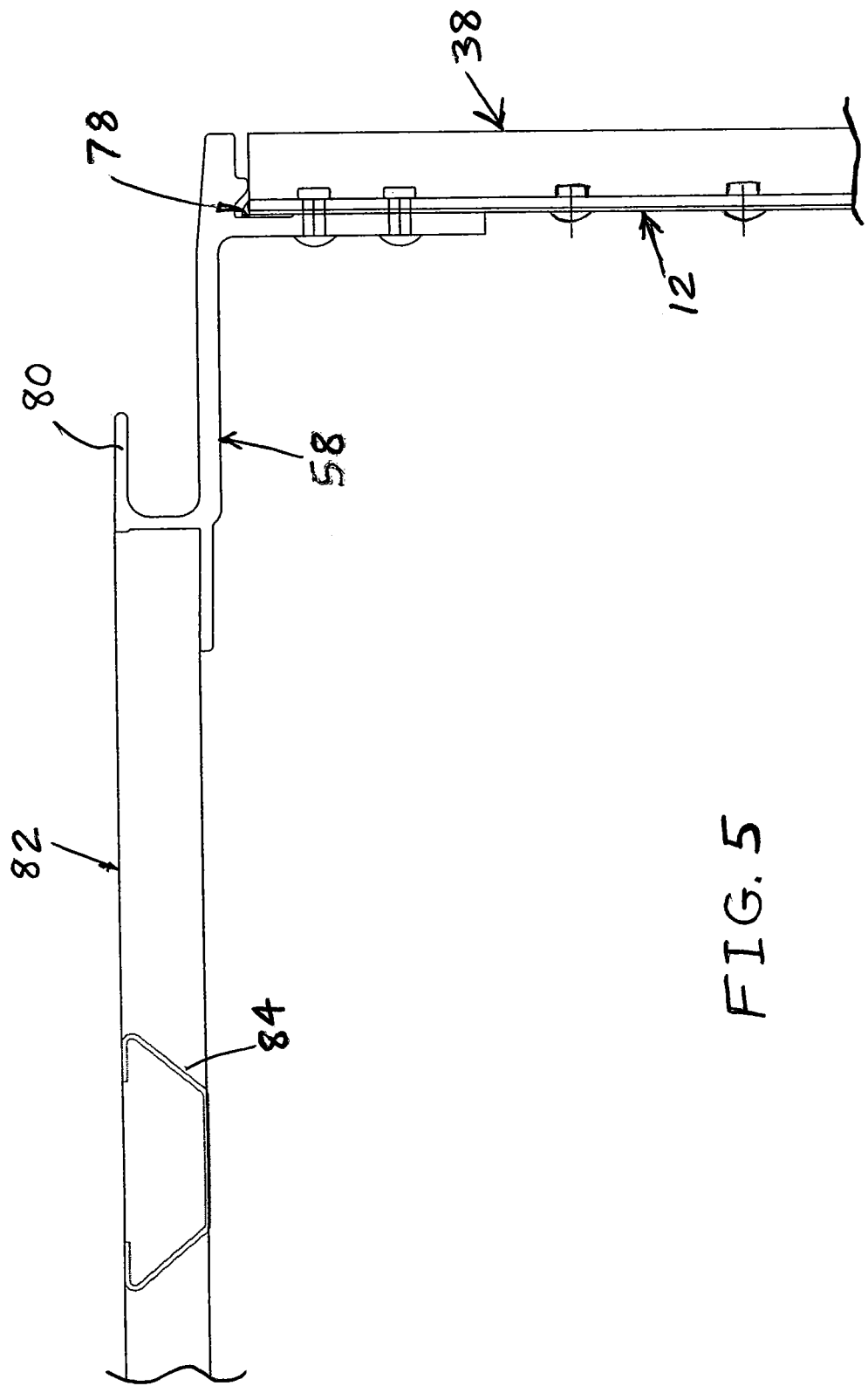
FIG. 5 is an enlarged view of the top portion of FIG. 3, corresponding to the boxed region 5 of FIG. 1.

As also shown in FIG. 3, the top end of post 38 may be attached to top rail 58 via rivets or other fasteners. Panel 12 may be sandwiched between flange 32 of post 38 and top rail 58 at the location of the rivet. Sealant 78 may be inserted between panel 12 and top rail 58 in order to provide a substantially water-tight seal. Top rail 58 may include a horizontal leg 80 which engages and/or supports a roof sheet 82. Roof sheet 82 may include a plurality of roof bows 84, one of which is shown in FIG. 3. FIG. 5 is an enlarged view of the top portion of FIG. 3.

Although rivets may be used attach panels 12 and posts 38 to top rail 58, and rivets may be used to attach panels 12 to top rail 58, it is also possible to use adhesive bonds, threaded fasteners (e.g., screws, bolts), seam welding, spot welding, nails or pins along the joints to attach panels 12 and/or posts 38 to top rail 58.

In addition to providing a low drag coefficient, the convex curvature of posts 38 provides the posts with increased structural strength. For example, the inventive posts 38 are more difficult to bend about an axis that is parallel to the side panels than are flat or planar logistics posts.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A sidewall construction arrangement for a trailer, said arrangement comprising:
    a plurality of upstanding sidewall panels; and
    a plurality of vertically oriented posts, each said post disposed between and engaging a respective substantially coplanar pair of said panels, each said post having an exterior surface that is entirely continuous in a vertical cross-sectional view substantially throughout a portion of the post that extends away from the panels in a lateral direction, the portion of the post that extends away from the panels in a lateral direction having a varying width relative to the lateral direction, the post having a maximum said width that is closer to a leading edge of the post than to a trailing edge of the post.

2. The arrangement of claim 1 wherein the lateral direction is perpendicular to a plane defined by said coplanar pair of said panels.

3. The arrangement of claim 1 wherein said exterior surface is entirely continuously curved in a vertical cross-sectional view throughout a portion of the post that extends away from the panels in a lateral direction.

4. The arrangement of claim 1 wherein said exterior surface is entirely continuously arcuate in a vertical cross-sectional view throughout a portion of the post that extends beyond the panels in a lateral direction.

5. The arrangement of claim 1 wherein said exterior surface is entirely continuously convex throughout a portion of the post that extends away from the panels in a lateral direction.

6. A sidewall construction arrangement for a trailer, said arrangement comprising:
    a plurality of upstanding sidewall panels; and
    a plurality of vertically oriented posts, each said post disposed between and engaging a respective substantially coplanar pair of said panels, each said post having an exterior surface that is entirely continuous in a vertical cross-sectional view substantially throughout a portion of the post that extends away from the panels in a lateral direction, each said portion of the post that extends away from the panels in a lateral direction having a hemi-teardrop shape.

7. A sidewall construction arrangement for a trailer, said arrangement comprising:
    a plurality of upstanding sidewall panels; and
    a plurality of vertically oriented posts, each said post disposed between a respective substantially coplanar pair of said panels, each said post having an exterior surface that is convexly curved with respect to a vertical cross-sectional view in a portion of the post that extends from the panels in a lateral direction, a shape of said exterior surface being defined by:

$x = \cos t$ $y = \sin t \sin^m(t/2)$ wherein x is an axis defined from a leading edge of the portion of the post that extends from the panels in a lateral direction to a trailing edge of the portion of the post that extends from the panels in a lateral direction, and y is an axis aligned with the lateral direction.

8. A sidewall construction arrangement for a trailer, said arrangement comprising:
    a plurality of upstanding sidewall panels; and
    a plurality of vertically oriented posts, each said post disposed between a respective substantially coplanar pair of said panels, each said post having an exterior surface that is convexly curved with respect to a vertical cross-sectional view in a portion of the post that extends from the panels in a lateral direction, the portion of the post that extends from the panels in a lateral direction having a varying width relative to the lateral direction, the post having a maximum said width that is closer to a leading edge of the post than to a trailing edge of the post.

9. The arrangement of claim 8 wherein said exterior surface is entirely continuously curved in a vertical cross-sectional view throughout a portion of the post that extends from the panels in a lateral direction.

10. The arrangement of claim 8 wherein said exterior surface is entirely continuously arcuate in a vertical cross-sectional view throughout a portion of the post that extends from the panels in a lateral direction.

11. The arrangement of claim 8 wherein the lateral direction is perpendicular to a plane defined by said coplanar pair of said panels.

12. A sidewall construction arrangement for a trailer, said arrangement comprising:
    a plurality of upstanding sidewall panels; and
    a plurality of vertically oriented posts, each said post disposed between a respective substantially coplanar pair of said panels, each said post having a portion with an exterior surface that is convexly curved, the portion of the post having a leading edge and a trailing edge, the portion having a maximum width relative to the lateral direction, the maximum width being closer to the leading edge than to the trailing edge.

13. The arrangement of claim 12 wherein the portion of the post extends beyond the panels in a lateral direction, each said post physically contacting both of said substantially coplanar pair of said panels.

14. The arrangement of claim 12 wherein a shape of said exterior surface is defined by:

$$x = \cos t$$

$$y = \sin t \sin^m(t/2)$$

wherein x is an axis defined from a leading edge of the portion of the post to a trailing edge of the portion of the post, and y is an axis aligned with the lateral direction.

15. The arrangement of claim 12 wherein the portion of the post has a varying width relative to the lateral direction, the post having a maximum said width that is closer to a leading edge of the post than to a trailing edge of the post.

16. The arrangement of claim 12 wherein each said post includes a first flange attached to the leading edge and a second flange attached to the trailing edge, the first and second flanges being substantially coplanar and each being attached to a respective one of the substantially coplanar pair of said panels.

17. The arrangement of claim 12 wherein each said post is fixed.

18. The arrangement of claim 1 wherein at least one said post is discrete from the respective pair of said panels.

\* \* \* \* \*